United States Patent
Moyer

(10) Patent No.: US 7,228,401 B2
(45) Date of Patent: Jun. 5, 2007

(54) INTERFACING A PROCESSOR TO A COPROCESSOR IN WHICH THE PROCESSOR SELECTIVELY BROADCASTS TO OR SELECTIVELY ALTERS AN EXECUTION MODE OF THE COPROCESSOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 580 days.

(21) Appl. No.: 10/054,577

(22) Filed: Nov. 13, 2001

(65) Prior Publication Data

US 2003/0093648 A1     May 15, 2003

(51) Int. Cl.
    *G06F 15/163*      (2006.01)

(52) U.S. Cl. .................... 712/34; 712/225; 712/29; 710/33; 710/36

(58) Field of Classification Search ................ 712/29, 712/34, 35, 225; 710/33, 36; 711/152, 163
See application file for complete search history.

(56) References Cited

U.S. PATENT DOCUMENTS

| | | | | |
|---|---|---|---|---|
| 5,117,350 | A * | 5/1992 | Parrish et al. ................ | 711/1 |
| 5,485,624 | A | 1/1996 | Steinmetz et al. | |
| 5,923,893 | A * | 7/1999 | Moyer et al. ................ | 712/38 |
| 5,983,338 | A | 11/1999 | Moyer et al. | |
| 6,047,122 | A * | 4/2000 | Spiller ........................ | 718/108 |
| 6,138,185 | A * | 10/2000 | Nelson et al. ............... | 710/33 |
| 6,223,277 | B1 * | 4/2001 | Karguth ...................... | 712/224 |

FOREIGN PATENT DOCUMENTS

EP      0 901 071 A2     3/1999

OTHER PUBLICATIONS

Borkar et al. iWarp: An Integrated Solution to High-Speed Parallel Computing. 1988, Proceedings of the 1988 ACM/IEEE conference on Supercomputing.*

(Continued)

*Primary Examiner*—Donald Sparks
*Assistant Examiner*—Tonia L Meonske
(74) *Attorney, Agent, or Firm*—Joanna G. Chiu

(57) ABSTRACT

The present invention relates generally to interfacing a processor with at least one coprocessor. One embodiment relates to a processor having a set of broadcast specifiers which it uses to selectively broadcast an operand that is being written to a register within the processor to a coprocessor communication bus. Each broadcast specifier may therefore include a broadcast indicator corresponding to each general purpose register of the processor. An alternate embodiment may also use the concept of broadcast regions where each broadcast region may have a corresponding broadcast specifier where one broadcast specifier may correspond to multiple broadcast regions. Alternatively, in one embodiment, the processor may use broadcast regions independent of the broadcast specifiers where the coprocessor is able to alter its functionality in response to the current broadcast region. In one embodiment, the processor may provide a region specifier via the coprocessor communication bus to indicate the current broadcast region.

14 Claims, 8 Drawing Sheets

OTHER PUBLICATIONS

Borkar et al. Supporting Systolic and Memory Communication in iWarp. 1990. ACM Sigarch Computer Architecture News, Proceedings of the 17th Annual International Symposium on Computer Architecture.*

Gates et al., "DynaMICs: An Automated and Independent Software-Fault Detection Approach," *High Assurance Systems Engineering, 1999 Proceedings, 4th IEEE International Symposium on Washington, DC USA*, Nov. 17-19, 1999, Los Alamitos, CA, USA, *IEEE Comput. Soc.*, Nov. 17, 1999, pp. 11-19.

PCT/US02/34955 PCT International Search Report mailed Feb. 27, 2003.

* cited by examiner

BROADCAST ENABLE BITS

0 = THE REGISTER ASSOCIATED WITH THIS BIT HAS RESULT BROADCAST DISABLED.
1 = THE REGISTER ASSOCIATED WITH THIS BIT HAS RESULT BROADCAST ENABLED.

INTERFACING A PROCESSOR TO A COPROCESSOR IN WHICH THE PROCESSOR SELECTIVELY BROADCASTS TO OR SELECTIVELY ALTERS AN EXECUTION MODE OF THE COPROCESSOR

FIELD OF THE INVENTION

The present invention relates in general to a data processing system having a processor and at least one coprocessor, and, more particularly, to a method and apparatus for interfacing the processor to the coprocessor.

BACKGROUND OF THE INVENTION

The ability to extend a baseline architecture and processor functionality through dedicated and specialized hardware functional elements is an important aspect of scaleable and extensible architectures.

One of the preferred methods for extending a baseline architecture and processor functionality is through the use of coprocessors. These are dedicated, usually single purpose processors that operate at the direction of a processor. One of the traditional uses of coprocessors was as math coprocessors to selectively provide floating point capabilities to architectures that did not directly support such. Some example of such math coprocessors are the Intel 8087 and 80287. Some other potential uses or types of coprocessors include: multiply-accumulators, modulator/demodulators (modems), digital signal processors (DSP), vitterbi calculators, cryptographic processors, image processors, and vector processors.

One approach to implementing coprocessors is by use of a coprocessor interface that is tightly coupled enough that usage of the interface is fast enough such that invoking even fairly simple functions is advantageous, while abstracting the interface to such an extent that the processor architecture is isolated from as many of the details of any given coprocessor as possible. For example, such a tightly coupled coprocessor may receive operands and control words via a dedicated interface to the main processor. Often, the main processor will pass a value to a coprocessor after the main processor has generated it based on a set of operations performed by the main processor. After the final modification, it may be sent to the coprocessor. However, this final transfer involves an overhead which may be unacceptable for some coprocessor operations.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. A "*" symbol following a signal name indicates that the signal is an active low signal (meaning the logically true state is a logic level zero).

Figure 1:
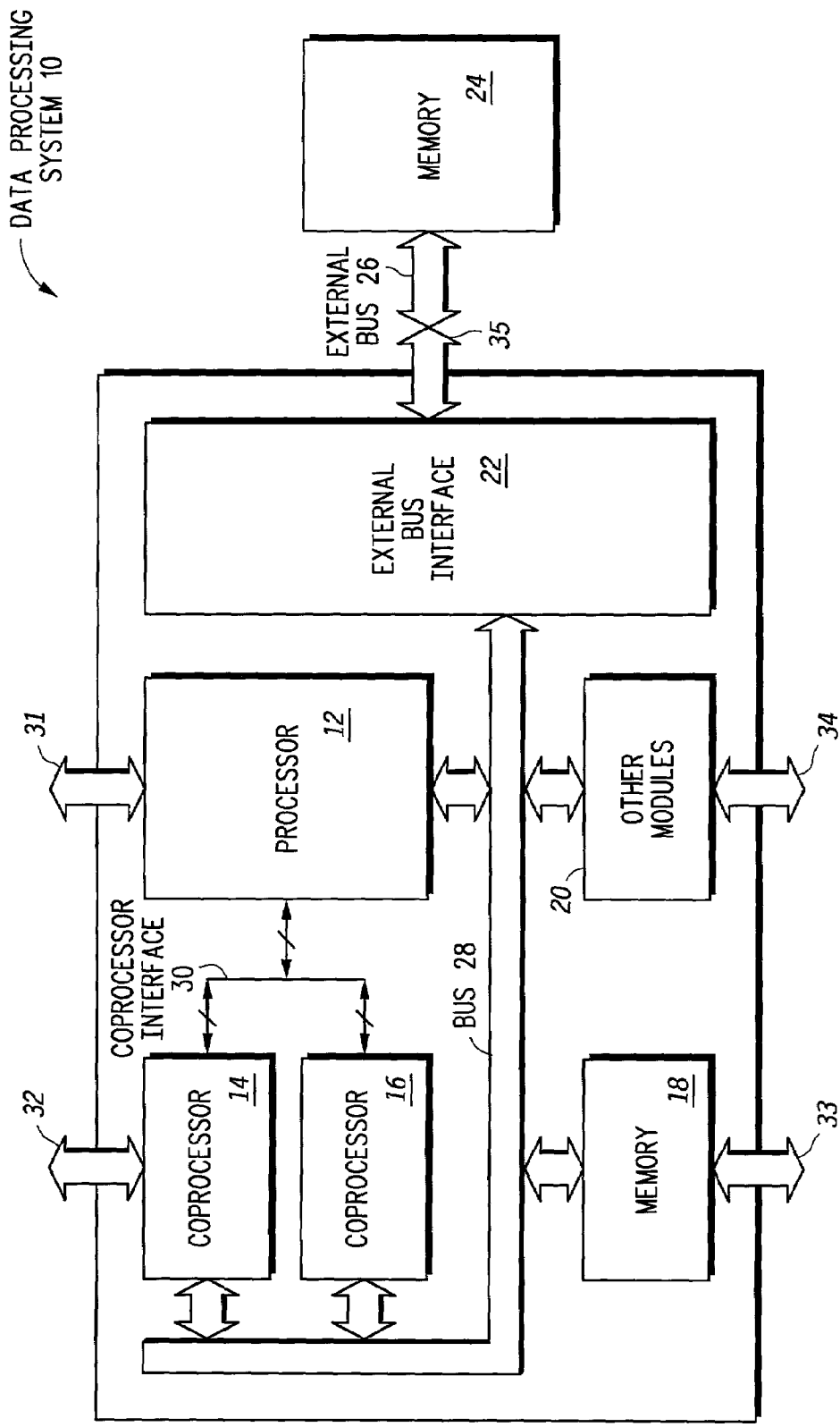
FIG. 1 is a block diagram illustrating one embodiment of a data processing system, in accordance with the present invention.

FIG. 1 is a block diagram that illustrates one embodiment of a data processing system 10 includes a processor 12, a coprocessor 14, a coprocessor 16, a memory 18, other modules 20 and external bus interface 22 which are all bidirectionally coupled by way of bus 28. Alternate embodiments of the present invention may have only one coprocessor 14, two coprocessors 14 and 16 or even more coprocessors (not shown). External bus interface 22 is bidirectionally coupled to external bus 26 by way of integrated circuit terminals 35. Memory 24 is bidirectionally coupled to external bus 26. Processor 12 may optionally be coupled external to data processing system 10 by way of integrated circuit terminals 31. Coprocessor 14 may optionally be coupled external to data processing system 10 by way of integrated circuit terminals 32. Memory 18 may optionally be coupled external to data processing system 10 by way of integrated circuit terminals 33. Other modules 20 may optionally be coupled external to data processing system 10 by way of integrated circuit terminals 34. Processor 12 is bidirectionally coupled to both coprocessor 14 and coprocessor 16 by way of coprocessor interface 30. Although not shown in FIG. 1, alternate embodiments may also have additional memories similar to memory 18 coupled via bus 28.

Figure 2:
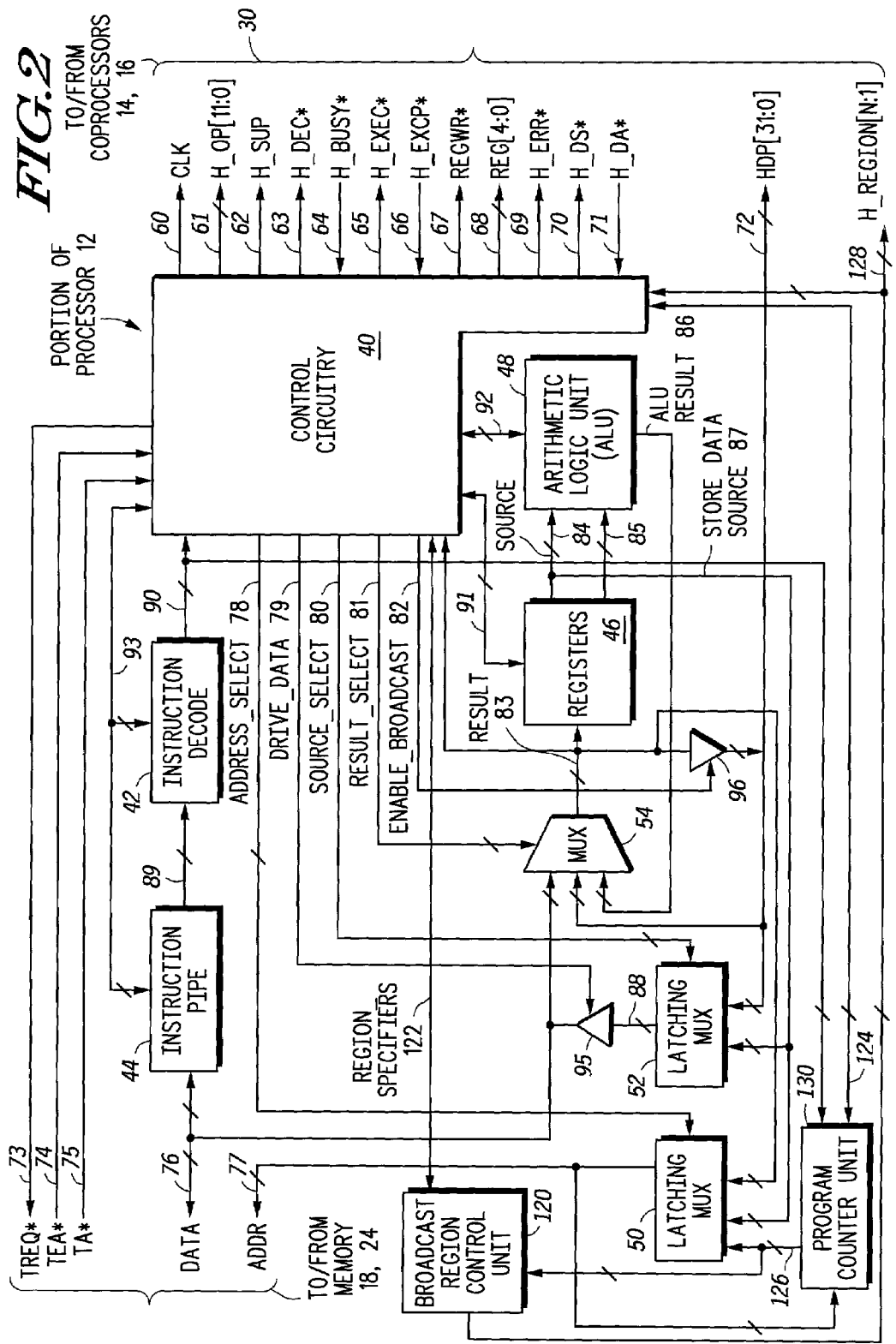
FIG. 2 is a block diagram that illustrates one embodiment of a portion of processor of FIG. 1.

FIG. 2 is a block diagram that illustrates a portion of processor 12 of FIG. 1. In one embodiment processor 12 includes control circuitry 40, instruction decode circuitry 42, instruction pipe 44, registers 46, arithmetic logic unit (ALU) 48, latching multiplexer (MUX) 50, latching multiplexer (MUX) 52, multiplexer (MUX) 54, broadcast region control unit 120, and program counter unit 130. In one embodiment of the present invention, coprocessor interface 30 includes signals 60–72 and 128. Clock signal 60 is generated by control circuitry 40. Coprocessor operation signals 61 are generated by control circuitry 40 and are provided to coprocessors 14 and 16.

Supervisor mode signal 62 is generated by control circuitry 40 and is provided to coprocessors 14 and 16. Decode signal 63 is generated by control circuitry 40 and is provided to coprocessor 14 and 16. Coprocessor busy signal 64 is received by control circuitry 40 from coprocessor 14 or coprocessor 16. Execute signal 65 is generated by control circuitry 40 and is provided to coprocessors 14 and 16. Exception signal 66 is received by control circuitry 40 from coprocessor 14 or coprocessor 16. Register write (REGWR*) signal 67 is generated by control circuitry 40 and is provided to coprocessors 14 and 16. Register signals (REG[4:0]) 68 are generated by control circuitry 40 and are provided to coprocessors 14 and 16. Error signal (H_ERR*) 69 is generated by control circuitry 40 and is provided to coprocessors 14 and 16. Data strobe signal (H_DS*) 70 is generated by control circuitry 40 and is provided to coprocessors 14 and 16. Data acknowledge signal (H_DA*) 71 is received by control circuitry 40 from coprocessor 14 or coprocessor 16. Region signal (H_REGION[N:1]) is generated by broadcast region control unit 20 and is provided to control circuitry 40 and coprocessors 14 and 16. Hardware data ports signal (HDP[31:0]) 72 which are also considered part of coprocessor interface 30 are bi-directional between coprocessors 14 and 16 and internal circuitry within processor 12.

In one embodiment of the present invention a plurality of signals are provided to or from bus 28 in order to load or store data in memory 18 and/or memory 24. In one embodiment these signals include a transfer request signal (TREQ*) 73 that is generated by control circuitry 40 and provided to bus 28. Transfer error acknowledge signal (TEA*) 74 is provided to control circuitry 40 by way of bus 28. Transfer acknowledge signal (TA*) 75 is provided to control circuitry 40 by way of bus 28. Instructions are provided from bus 28 to instruction pipe 44 by way of conductors 76. Data is provided to MUX 54 by way of conductors 76. Drive Data signal 79 enables tristate buffer 95 to provide data from latching MUX 52 by way of conductors 88 and 76. Address Select signal 78 enables latching MUX 50 to provide addresses to bus 28 by way of conductors 77. Another input to MUX 54 is provided by the HDP signal (HDP[31:0]) 72. Another input to MUX 54 is provided by way of the ALU result conductors 86. The output of MUX 54, result signals 83, are provided to registers 46 and to the input of tristate buffer 96. ENABLE_BROADCAST signal 82 enables tristate buffer 96 to drive result signals 83 on HDP[31:0] 72. The output of tristate buffer 96 is also coupled to the input of latching MUX 52. Result signals 83 are provided as an input to latching MUX 50 and as an input to control circuitry 40. Result signals 83 are provided to registers 46 by way of MUX 54. Result Select signal (RESULT_SELECT) 81 selects which input of MUX 54 is to be driven on result conductors 83. Source select signal (SOURCE_SELECT) 80 is provided to latching MUX 52 to select which signal shall be driven to tristate buffer 95 on conductors 88. Control circuitry 40 provides control information and receives status information from registers 46 by way of conductors 91. Control circuitry 40 provides control signals and receives status signals from arithmetic logic unit 48 by way of conductors 92. Control circuitry 40 provides control and information signals and receives control and information signals from broadcast region control unit 20 by way of REGION SPECIFIERS 122. Control circuitry provides control signals and receives status signals from program counter unit 130 by way of conductors 124. Control circuitry 40 provides control signals and receives status signals from instruction pipe 44 and instruction decode circuitry 42 by way of conductors 93. Instruction pipe 44 is coupled to provide instructions to instruction decode circuitry 42 by way of conductors 89. Instruction decode circuitry 42 provides decoded instruction information to control circuitry 40 and program counter unit 130 by way of conductors 90. Registers 46 provide source operands to arithmetic logic unit 48 by way of conductors 84. Registers 46 provide data to be stored in memory 18 or memory 24 by way of conductors 84, latching MUX 52, tristate buffer 95 and conductor 76. Register 46 provide address information to memory 18 or memory 24 by way of conductors 84, latching MUX 50 and address conductor 77. Registers 46 provide a second source operand to arithmetic logic unit 48 by way of conductors 85. Program counter unit 130 provides the program counter to memory 18 or memory 24 by way of conductors 126, latching MUX 50 and address conductor 77. Program counter 130 also provides program counter information to broadcast region control unit 120. Program counter 130 receives the output address from latching MUX 50 as an input in order to generate the next memory address.

Note that alternate embodiments of the present invention may include any number of registers in registers 46. Also, alternate embodiments of the present invention may use a pair of unidirectional busses instead of bidirectional busses, and multiplexer logic instead of tristate buffers to convey information. For example, HDP[31:0] or other bidirectional busses could be implemented as separate input and output portions.

Figure 3:
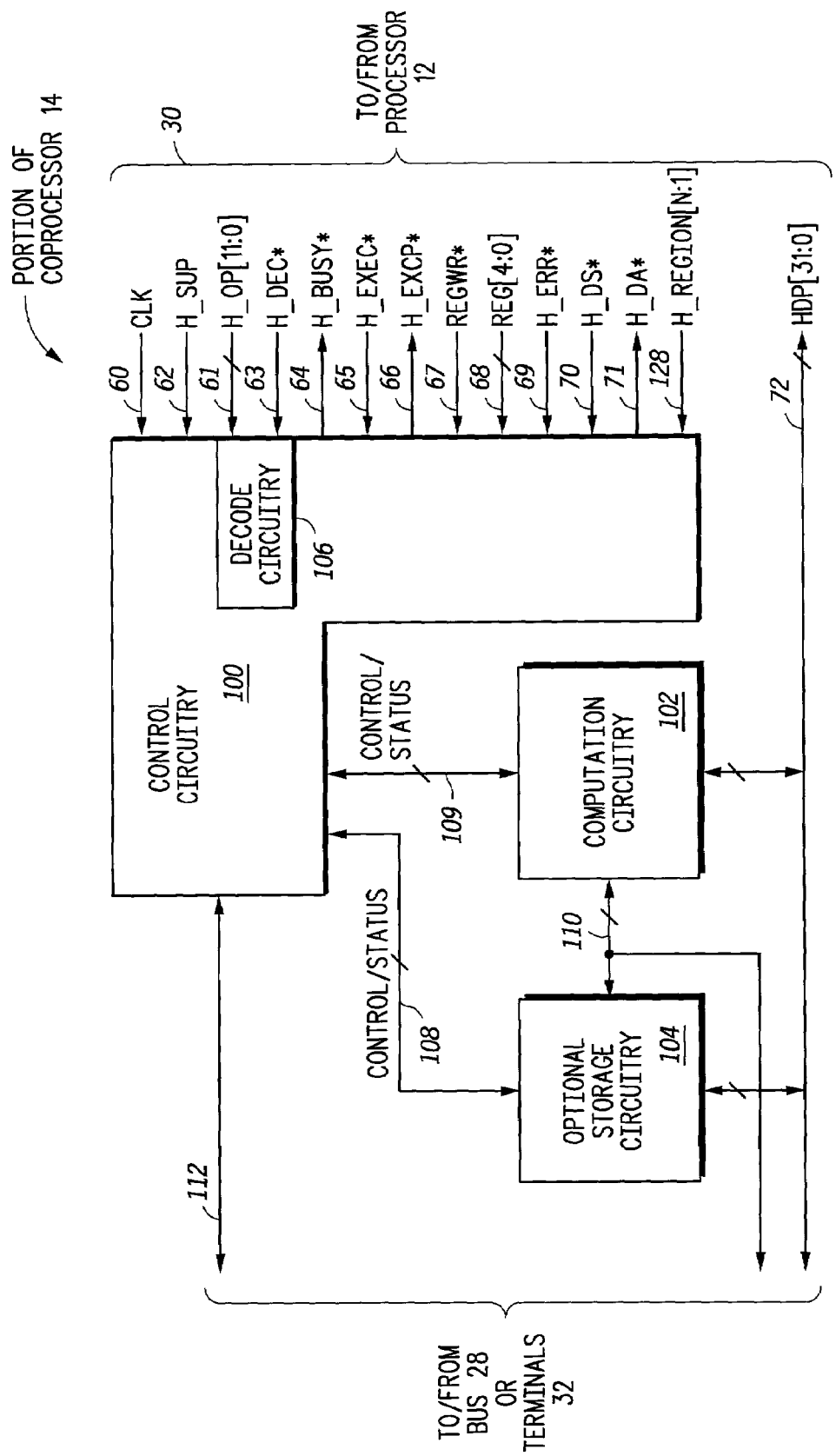
FIG. 3 is a block diagram that illustrates one embodiment of a portion of coprocessor of FIG. 1.

FIG. 3 is a block diagram that illustrates one embodiment of a portion of coprocessor 14. In one embodiment, coprocessor 14 includes control circuitry 100, computation circuitry 102 and optional storage circuitry 104. Control circuitry 100 is bidirectionally coupled to processor 12 by way of coprocessor interface 30 which includes signals 60–72 and 128. In one embodiment of the present invention control circuitry 100 includes decode circuitry 106 which receives the operation signals 61 and the decode signal 63 from processor 12. Control circuitry 100 provides control information and receives status information from optional storage circuitry 104 by way of conductors 108. Control circuitry 100 provides control information and receives status information from computation circuitry 102 by way of conductors 109. Computation circuitry 102 and optional storage circuitry 104 are bidirectionally coupled by way of conductors 110. One or more of signals 110 may be provided to or from bus 28 or integrated circuit terminals 32. Control circuitry 100 may receive or provide information to or from bus 28 or integrated circuit terminals 32 by way of conductors 112. Signals 72 may be bidirectionally coupled to computation circuitry 102 and optional storage circuitry 104. In addition, signals 72 may be bidirectionally coupled to bus 28 or integrated circuit terminals 32. In an alternate embodiment of the present invention, optional storage circuitry 104 may not be implemented. In embodiments of the present invention in which optional storage circuitry 104 is implemented, it may be implemented using registers, any type of memory, any type of storage circuit including latches or programmable logic arrays, etc. In alternate embodiments of the present invention, computation circuitry 102 may perform any type of logic or computational function.

The system provides support for task acceleration by an external coprocessor 14 (or hardware accelerator) which is optimized for specific application related operations. These external coprocessors 14, 16 may be as simple as a coprocessor 14 for performing a population count, or a more complicated function such as a DSP acceleration coprocessor 14 or coprocessor 16 capable of high speed multiply/accumulate operation.

Data is transferred between the processor 12 and a coprocessor 14 by one or more of several mechanisms as appropriate for a particular implementation. These can be divided into transfers to the coprocessor 14, and transfers from the coprocessor 14.

One of the mechanisms for transferring data to coprocessor 14 is the Register Broadcast mechanism, which involves no instruction primitive, but is a by-product of normal processor 12 operation. This involves reflecting updates to processor 12's general purpose registers ("GPR") 46 across the interface such that a coprocessor 14 can monitor updates to one or more processor 12 registers. This might be appropriate if a coprocessor 14 "overlays" a GPR 46 for an internal register or function. In this case, no explicit passing of parameters from processor 12 to coprocessor 14 would be required.

Another approach to transferring data to coprocessor 14 is a data-driven approach to coprocessing which involves the transfer of one or more data items to a coprocessor. The transfer of these items may invoke a coprocessing operation without explicit transfer of a coprocessor command or instruction. The reduction in communications overhead with coprocessor 14 can result in a significant performance improvement.

Instruction primitives are provided in the base processor 12 for explicit transfer of operands and instructions between external coprocessors 14, 16 and the processor 12 as well. A handshaking mechanism is provided to allow control over the rate of instruction and data transfer.

Note that coprocessor 14 functions are designed to be implementation specific units, thus the exact functionality of a given unit is free to be changed across different implementations, even though the same instruction mappings may be present.

Figure 4:
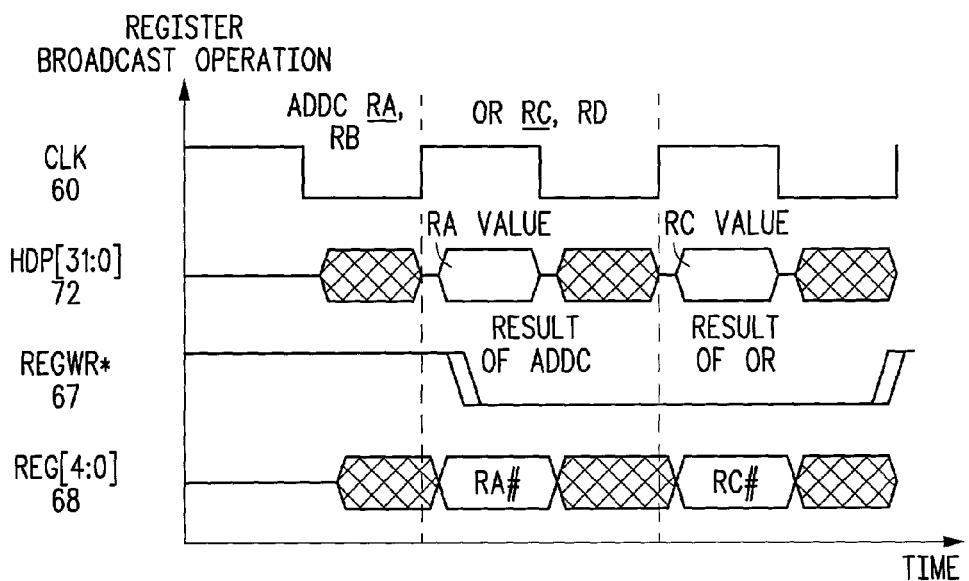
FIG. 4 is a timing diagram that illustrates one embodiment of a register broadcast operation.

FIG. 4 is a timing diagram that illustrates a register broadcast operation. To avoid the performance overhead of parameter passing to coprocessor 14 or an external monitor, a register broadcast mechanism (which can also be referred to as a register snooping mechanism) is provided. This allows coprocessor 14 to implement a shadow copy of one or more of processor's 12 general registers 46. The capability is implemented by transferring the value being written into one of the processor GPRs 46 and an indication of which register 46 is being updated for each GPR update. (Note that the registers that are underlined, e.g. RA and RC, denote the destination register of the corresponding instruction, e.g. ADDC and OR, respectively) A strobe signal REGWR* 67 is asserted for each register update. The value is transferred across the 32-bit bidirectional data path HDP [31:0] 72, and a 5-bit register number bus provides a pointer to the actual processor register 46 being updated (REG[4:0]) 68. The register number may refer to a register 46 in a normal file or in an alternate file. In the preferred embodiment, alternate file registers are indicated by REG[4]=1, and normal file registers by REG[4]=0. However, note this invention does not depend in any way on the actual partitioning of the register set.

Coprocessor 14 may latch the value internally along with an indication of the destination register 46 number to avoid an explicit move of register information at a later time. This functionality may also be used by a debug coprocessor 14 to track the state of the register file 46 or a subset of it. FIG. 4 shows an example of the broadcasting capability.

The broadcasting capability shown in reference to FIG. 4 performs a broadcast via HDP[31:0] 72 for every write transaction to the register file. This capability therefore allows coprocessor 14 to maintain a shadow copy of the processor 12's register file (i.e. GPR 46), and removed the need to explicitly pass some parameters from processor 12 to coprocessor 14. However, a need exists for the ability to further control the broadcasting capabilities of processor 12 and coprocessor 14. Therefore, FIGS. 5–9 illustrate one embodiment of the present invention that allows for a selective broadcast capability for processor 12 and allows for a selective update policy for coprocessor 14.

Figure 5:
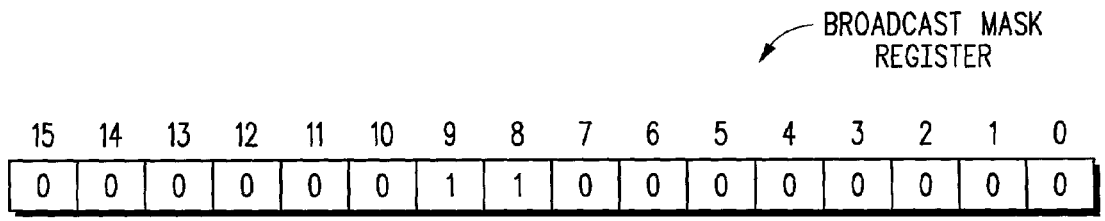
FIG. 5 is a block diagram that illustrates one embodiment of a broadcast mask register.

FIG. 5 illustrates a broadcast mask register that allows for the implementation of a selective broadcast capability according to one embodiment of the present invention. Therefore, instead of broadcasting every result update to GPR 46, the broadcast mask register may be used to select a subset of GPR 46 for which results are broadcast to coprocessor 14. For example, for each register in GPR 46, a single bit may be used as a broadcast indicator to determine if an update to that particular register will result in transferring the updated register contents to coprocessor 14 (via HDP[31:0] 72). FIG. 5 illustrates one example of a broadcast mask register where GPR 46 is assumed to have 16 registers. In this example, 0 indicates that the register associated with the particular bit has its result broadcast disabled and a 1 indicates that the register associated with the particular bit has its result broadcast enabled. Therefore, in the example of FIG. 5, only updates to registers corresponding to bit locations 8 and 9 (which, in one embodiment, may refer to register R8 and register R9 within GPR 46) are broadcast to coprocessor 14. If GPR 46 only contains 8 registers, then the broadcast mask register need only be 8 bits long. Therefore, the broadcast mask register can be considered to be a broadcast specifier having a set of broadcast indicators corresponding to GPR 46.

In one embodiment, the broadcast mask register (e.g. broadcast specifier) is user programmable (accessible by software) and may therefore be modified as the system state changes in order to account for different coprocessing activity over time as new requirements emerge. In another embodiment, the broadcast mask register or broadcast specifier may be accessible by an immediate field within a specific instruction designed to update the broadcast mask register. Alternate embodiments may also use different broadcast specifiers and different methods of providing a corresponding broadcast indicator for each register that may need its results broadcasted by processor 12 other than the use of broadcast mask register as illustrated in FIG. 5. For example, a register mask field may be stored in memory 18 or 24 corresponding to GPR 46.

Through the use of a broadcast mask register (or other broadcast specifier), loading of HDP[31:0] 72 and overall power consumption can be reduced. For example, if a value is not required to be snooped by coprocessor 14, this value may be disabled from being broadcast by processor 12 by allocating a register within GPR 46 for storing this value and using the broadcast mask to disable the broadcast for this register. Therefore, if only a subset of calculated values needs to be broadcast from processor 12 to coprocessor 14, a subset of GPR 46 may be reserved to hold these values and then only an update of one of these reserved register will result in a broadcast of the calculated value. Since the number of instructions which generate results is high, broadcasting all write results unnecessarily loads HDP[31:0] 72 and consumes more power. Thus, masking broadcasts such that only a subset of register updates is broadcast to coprocessor 14 results in a reduction of power consumption within processor 12 and reduces excessive load on HDP[31:0] 72.

Figure 6:
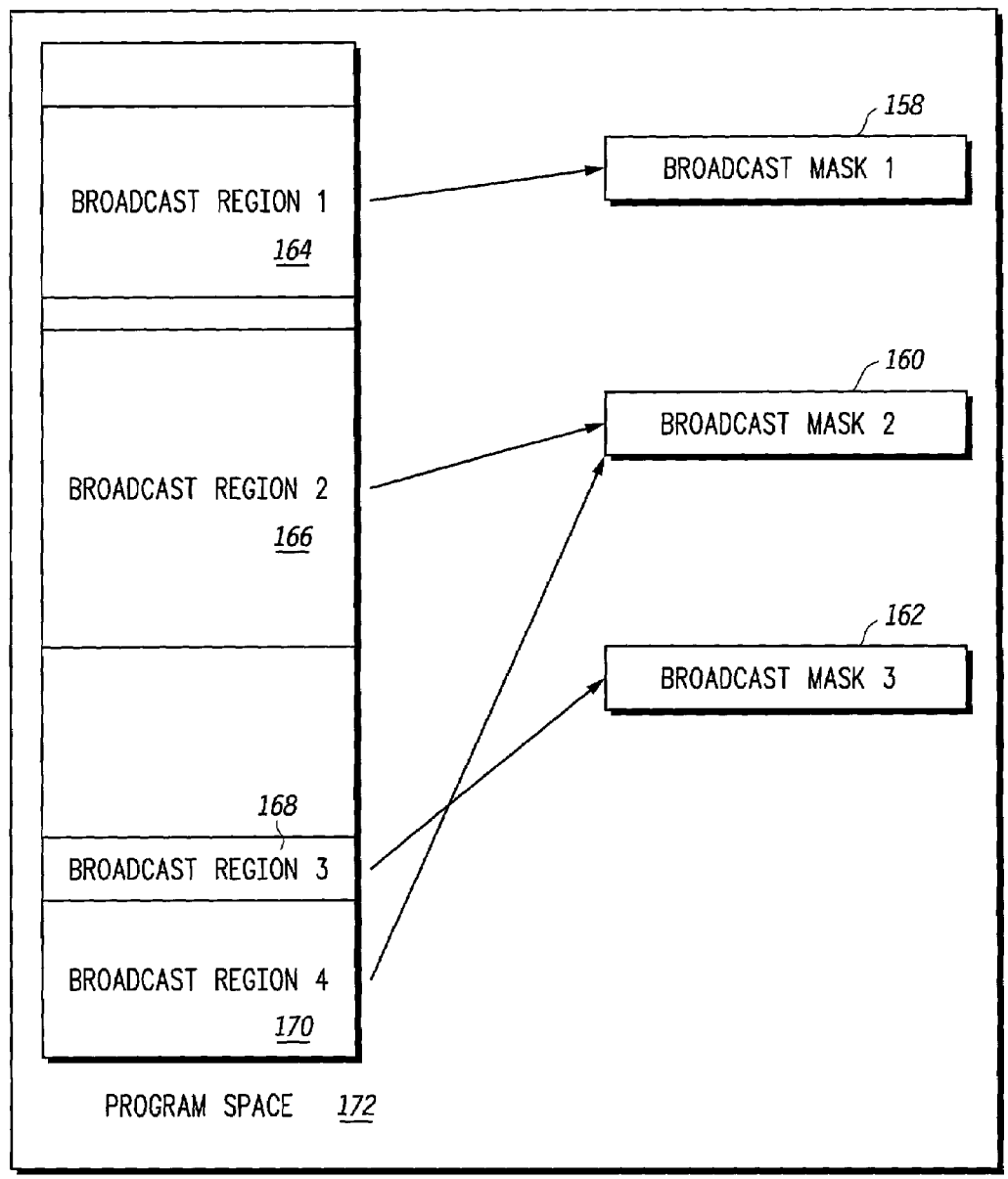
FIG. 6 is a block diagram that illustrates one embodiment of broadcast regions.

In order to further control broadcasting capabilities, broadcast regions may be used. FIG. 6 illustrates a sample program space 172 that is divided into four broadcast regions: broadcast region 1 164, broadcast region 2 166, broadcast region 3 168, and broadcast region 4 170. Program space 172 can be any program space within processor 12, and may be located in any program memory such as in memory 18 or 24. A broadcast region refers to a range of instruction addresses (i.e. program region or execution region) in which a broadcast is controlled. In FIG. 6, each broadcast region has a corresponding broadcast mask. For example, broadcast region 1 164 corresponds to broadcast mask 1 158, broadcast region 2 166 and broadcast region 4 170 both correspond to broadcast mask 2 160, and broadcast region 3 168 corresponds to broadcast mask 3 162. Therefore, a broadcast mask can correspond to more than one broadcast region.

The assignment of a broadcast mask to a broadcast region may be controlled in a plurality of ways. It may be fixed, or it may be under software control and be user programmable. Programming may be done either through a control register which pairs a broadcast mask with each implemented broadcast region, or through other storage means. As system execution proceeds, the association of a broadcast mask with a broadcast region may be altered under user program control, or by hardware monitoring of system events, or by any other control means appropriate for the data processing system.

When code is executing within a broadcast region, the corresponding broadcast mask is used to provide selective broadcasting of updated results. For example, within broadcast region 1 164, only those updates to the registers indicated by broadcast mask 1 158 are broadcast to coprocessor 14. Within broadcast region 2 166 or broadcast region 4 170, updates to the registers indicated by broadcast mask 2 160 are broadcast to coprocessor 14. Within broadcast region 3 168, updates to the registers indicated by broadcast mask 3 162 are broadcast to coprocessor 14.

The use of such broadcast regions also allows for simplified operation of coprocessor 14. For example, in some cases, coprocessor 14 no longer requires knowledge in the form of explicit commands from processor 12, but can instead operate in a data driven manner since processor 12 may be designed to pass only the exact driving items to coprocessor 14. Therefore, through the use of broadcast regions and broadcast masks, processor 12 may control its broadcasting capability and thus control the driving items it sends to coprocessor 14. By operating in a data-driven manner, overhead associated with passing individual control operations or instructions to coprocessor 14 or 16 may be reduced or eliminated, thus improving system performance and lowering system power dissipation.

Alternatively, broadcast regions 1–4 of FIG. 6 may also be used independently of broadcast masks 1–3. For example, broadcast regions may be defined as regions in which broadcasting does or does not occur. That is, for code within broadcast region 1 164, broadcasting may always occur for any update of GPR 46. However, broadcast region 2 may be defined such that for code within this range, broadcasting does not occur at all. Therefore, the broadcasting capability can also be selective based purely on broadcast regions rather than based purely on broadcast masks or a combination of broadcast masks and regions.

Figure 7:
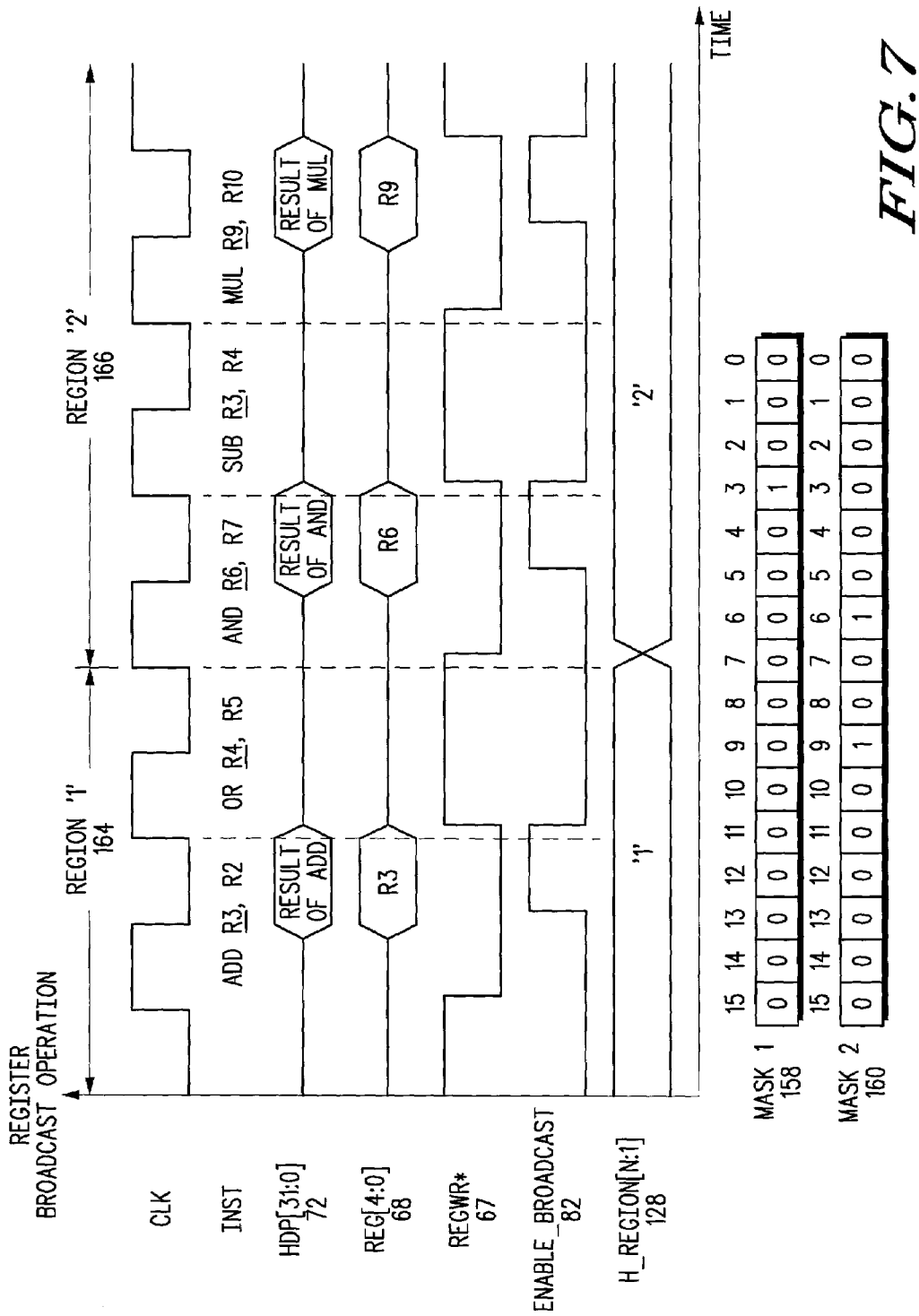
FIG. 7 is a timing diagram that illustrates an alternate embodiment of a register broadcast operation.

FIG. 7 illustrates a timing diagram of an example of a selective register broadcast operation. The instructions ADD R3, R2 and OR R4, R5 fall within broadcast region 1 164 of FIG. 6 and therefore correspond to broadcast mask 1 158, an example of which is also shown in FIG. 7. The instructions AND R6, R7, SUB R3, R4, and MUL R9, R10 fall within broadcast region 2 166 of FIG. 6 and therefore correspond to broadcast mask 2 160, an example of which is also shown in FIG. 7. The timing diagram of FIG. 7 indicates when the instructions are in the execution stage of instruction pipeline 44. The underlined register within each instruction indicates the destination register (the register to which the result is written).

Within region 1 164, the result of ADD R3, R2 is written to register R3 (where R3=R3+R2). Since broadcast mask 1 158 has a "1" written in bit location 3, any write to register R3 is to be broadcast by processor 12 via HDP[31:0] 72. Therefore, within the first clock cycle of the timing diagram of FIG. 7, the result of the ADD instruction (the result that is being written to R3 within processor 12) is broadcast on HDP[31:0] 72 to coprocessor 14. Since it is being broadcast, the register number corresponding to R3 is also provided to coprocessor 14 by REG[4:0] 68. REGWR* 67 is asserted to allow coprocessor 14 to write the incoming result to one of its registers, and ENABLE_BROADCAST 82 is asserted such that tristate buffer 96 of FIG. 2 can drive the result onto HDP[31:0] 72. Also, the region indicator is provided by H_REGION[N:1] 128 to coprocessor 14. Therefore, while code is executing in region 1, H_REGION[N:1] 128 (corresponding to an N-bit value) indicates a "1".

The OR R4, R5 instructions follows the ADD R3, R2 instruction and is still within broadcast region 1 164; however, its destination register is R4. According to broadcast mask 1 158, the results written to R4 are not to be broadcast; therefore, the result of the OR instruction is not provided to coprocessor 14, the register number is not required via REG[4:0] 68, and both REGWR* and ENABLE_BROADCAST are deasserted.

The next three instructions AND R6, R7, SUB R3, R4, and MUL R9, R10, all fall within broadcast region 2 166. R6, R3, and R9 are underlined indicating that they are the destination register for their corresponding instruction. Once broadcast region 2 166 has been entered, H_REGION[N:1] 128 changes state to indicate a '2'. Broadcast region 2 166 has a corresponding broadcast mask 2 160 which indicates that only the writes to register R9 and R6 should be broadcast. Therefore, as can be seen in the timing diagram of FIG. 7, only the results of the AND and MUL instruction are broadcast via HDP[31:0] 72 to coprocessor 14 while in broadcast region 2 166. The register number for each is also sent via REG[4:0] 68, and both REGWR* and ENABLE_BROADCAST 82 are asserted. However, the results of the SUB instruction are not broadcast because broadcast mask 2 160 indicates that within broadcast region 2 166, writes to register R3 should not be broadcast.

Figure 8:
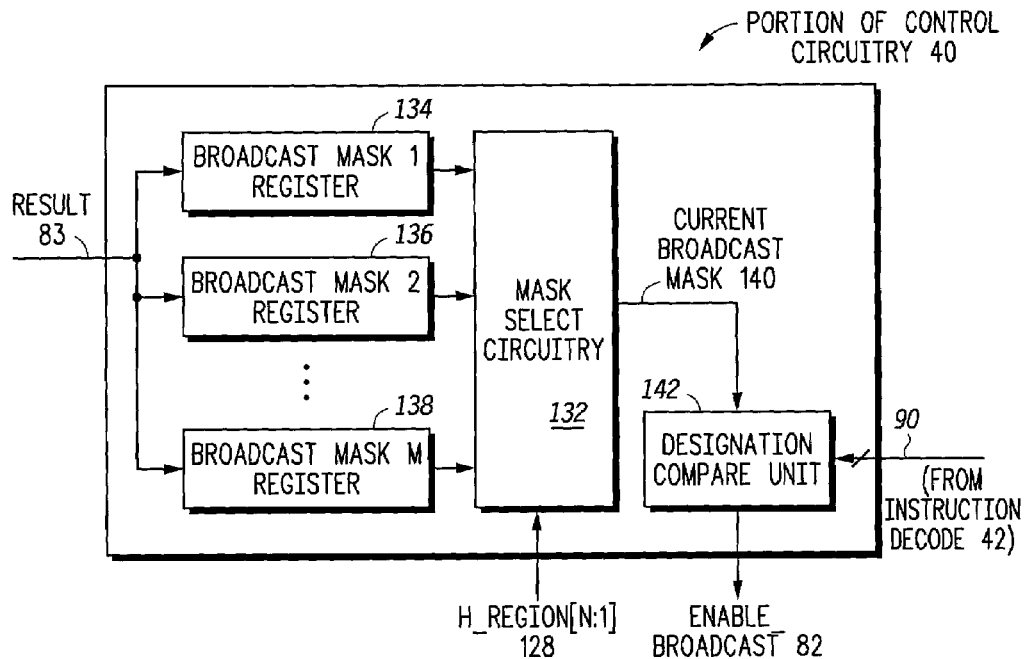
FIG. 8 is a block diagram that illustrates one embodiment of a portion of control circuitry of FIG. 2.

FIG. 8 illustrates, in block diagram form, one embodiment of a portion of control circuitry 40 of FIG. 2. Portion of control circuitry 40 includes broadcast mask 1 register 134, broadcast mask 2 register 136, and broadcast mask M register 138, mask select circuitry 132, and destination compare unit 142. Control circuitry 40 includes M number of broadcast mask registers. (Also note that control circuitry 40 may include only 1 or 2 broadcast mask registers even though 3 are illustrated.) Control circuitry 40 also includes mask select circuitry 132 coupled to broadcast mask 1 register 134, broadcast mask 2 register 136, and broadcast mask M register 138. Mask select circuitry also receives H_REGION[N:1] and provides current broadcast mask 140 to destination compare unit 142. Destination compare unit 142 is also coupled to conductors 90 from instruction decode 42 and provides ENABLE_BROADCAST 82 to tristate buffer 96.

In operation, the values of broadcast mask registers 134, 136, and 138 can be loaded via result signals 83. Therefore, an instruction may be issued to processor 12 to load values into the broadcast mask registers; therefore, control signals via conductors 90 may indicate that an instruction to load broadcast mask registers 134, 136, or 138 is to be executed, with the actual value being provided as result signals 83 from MUX 54. Therefore, in this embodiment, broadcast mask registers 134, 136, and 138 are user programmable. Mask select circuitry 132 receives H_REGION[N:1] 128 which is an N-bit value that indicates a currently executing region of code (i.e. a current program region). (Note that the number of regions, Y, may be more or less than the number of broadcast mask registers, depending on the design of processor 12.) Mask select circuitry 132 may be implemented in a number of different ways to associate one of broadcast mask registers 134, 136, . . . , 138 with each region indicated by H_REGION[N:1] 128. In one embodiment, mask select circuitry 132 associates a unique broadcast mask with each broadcast region. In alternate embodiments, mask select circuitry 132 may contain user programmable registers or other circuitry to allow arbitrary association of a selected broadcast mask to each broadcast region, thus allowing sharing of broadcast masks by different broadcast regions. Alternatively, the association of a broadcast mask with a broadcast region may be based on the state of data processing system 10, and may be dynamically altered without software intervention.

Mask select circuitry 132 therefore uses H_REGION[N:1] 128 to select the corresponding broadcast mask register (134, 136, or 138) and provide it as current broadcast mask 140. For example, if H_REGION[N:1] 128 indicates broadcast region 2 166 of FIG. 6, mask select circuitry 132 would select the broadcast mask register having the value corresponding to broadcast mask 2 160 (which could be stored in any one of broadcast mask registers 134, 136, or 138). Destination compare unit 142 then determines when an instruction causes an operand to be written to a destination register within GPR 46 and compares the destination register provided via conductors 90 by instruction decode 42 with current broadcast mask 140 to determine whether or not to enable a broadcast. If the compare indicates that the result should be broadcast, ENABLE_BROADCAST 82 is asserted so as to enable tristate buffer 96 to drive the results onto HDP[31:0] 72.

Figure 9:
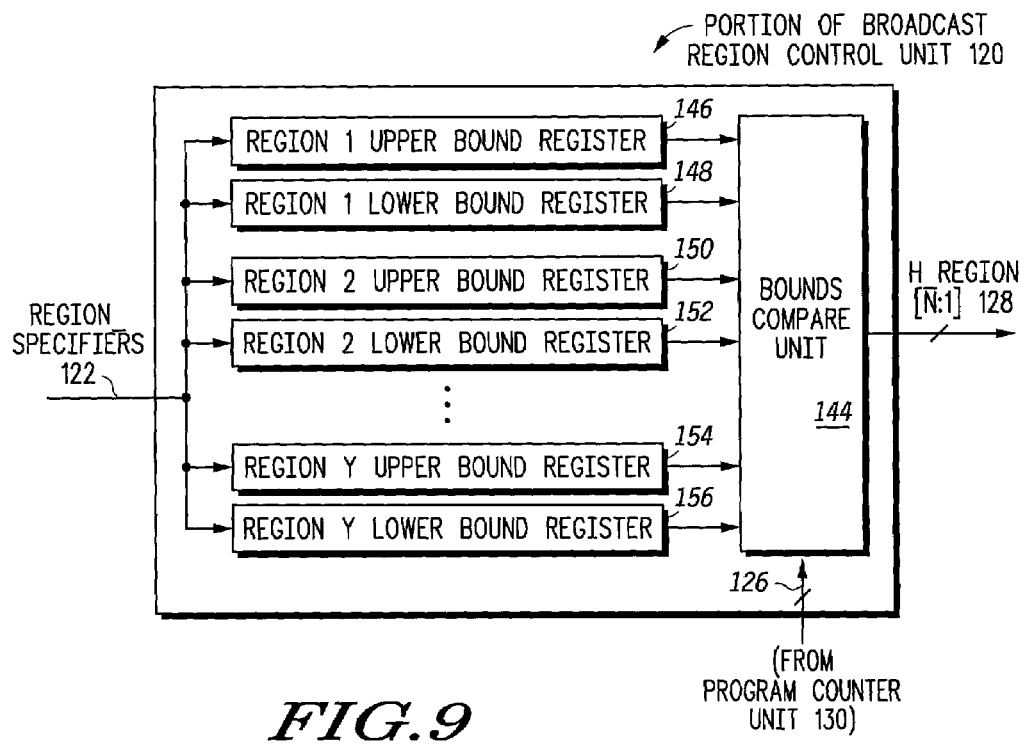
FIG. 9 is a block diagram that illustrates one embodiment of a portion of broadcast region control unit of FIG. 2.

FIG. 9 illustrates, in block diagram form, one embodiment of a portion of broadcast region control unit 120 of FIG. 2. Broadcast region control unit 120 includes region 1 upper bound register 146, region 1 lower bound register 148, region 2 upper bound register 150, region 2 lower bound register 152, region Y upper bound register 154, region Y lower bound register 156, and bounds compare unit 144. Region 1 upper bound register 146, region 1 lower bound register 148, region 2 upper bound register 150, region 2 lower bound register 152, region Y upper bound register 154, region Y lower bound register 156 may receive REGION_SPECIFIERS 122 from control unit 40, and store these specifiers. Unique specifiers may be provided for each bound register 146, 148, 150, 152, 154, and 156. These specifiers may be selected by control circuitry 40 from result 83, and thus be a function of instruction execution result value, or may be provided via instruction decode 90, or by other alternate means. Bounds registers 146, 148, 150, 152, 154, and 156 provide an output to bounds compare unit 144. Bounds compare unit 144 is also coupled to conductors 126 from program counter unit 130 and provides H_REGION[N:1] 128 as an output.

Figure 10:
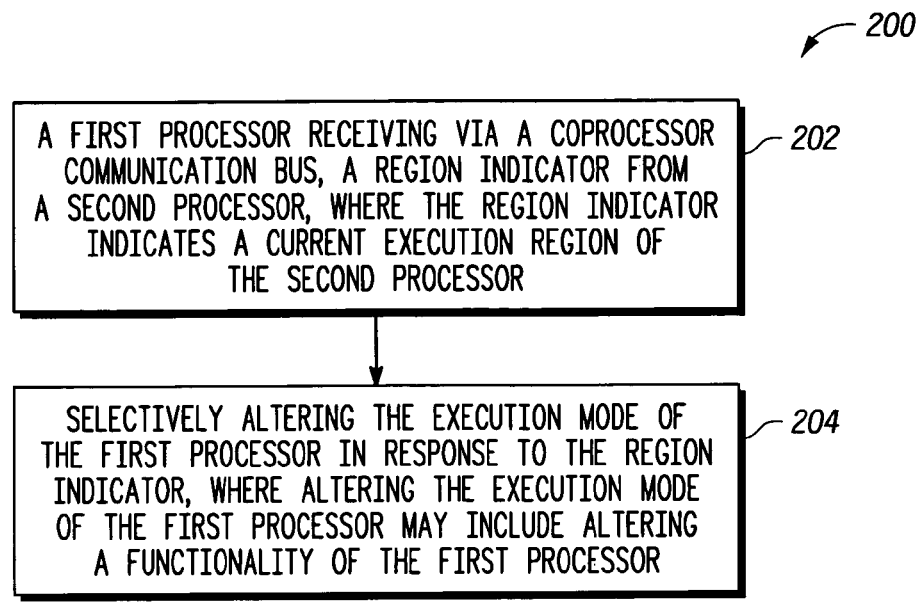
FIG. 10 is a flow diagram that illustrates a method in accordance with one embodiment of the present invention.

FIG. 10 illustrates a flow 200 in accordance with an embodiment of the present invention. Flow 200 begins with block 202 in which a first processor receives via a coprocessor communication bus, a region indicator from a second processor, where the region indicator indicates a current execution region of the second processor. Flow proceeds to block 204 in which the execution mode of the first processor is selectively altered in response to the region indicator, where altering the execution mode of the processor may include altering a functionality of the first processor.

Figure 11:
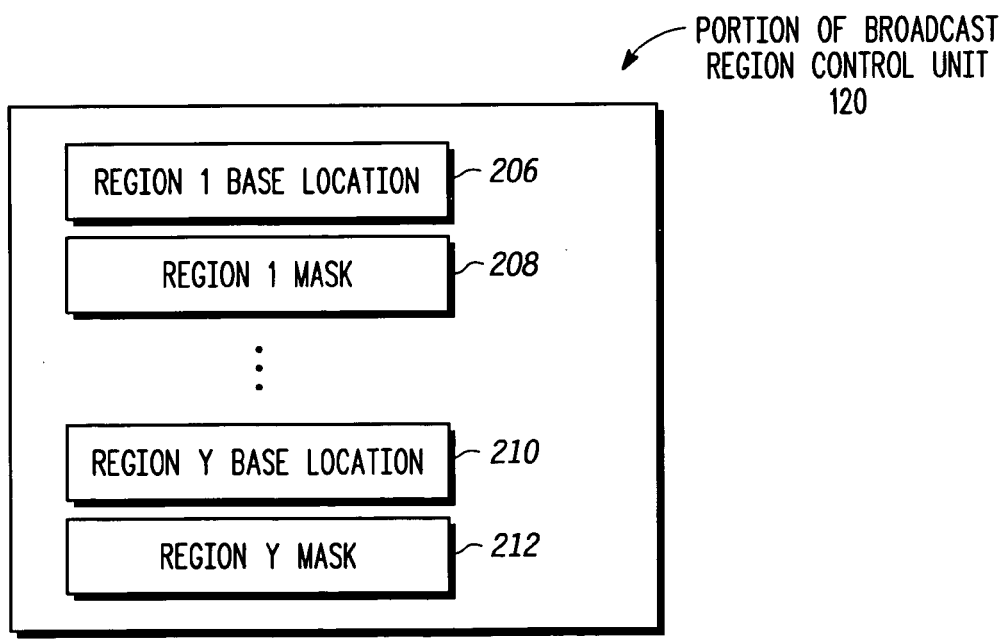
FIG. 11 is a block diagram that illustrates an alternate embodiment of a portion of broadcast region control unit of FIG. 2.

FIG. 11 illustrstes an alternate embodiment of a portion of broadcast region control unit 120 including region 2 base location 206, region 1 mask 208, region Y base location 210, and region Y mask location 212. Therefore, as discussed above, a base address and a mask may be used to define each broadcast region rather than a lower and upper bound.

In operation, region 1 upper bound register 146 and region 1 lower bound register 148 define the starting and ending instruction addresses that correspond to broadcast region 1 (such as, for example, broadcast region 1 164 of FIG. 6). Therefore, when the program counter (within program counter unit 130) falls within the starting and ending instruction addresses (i.e. within the upper and lower bounds of region 1), bounds compare unit 144 outputs H_REGION[N:1] 128 to indicate region 1. Likewise, each pair of upper and lower region bounds such as, for example, 150 and 152 or 154 and 156, define a broadcast region, and when the program counter falls within any of these regions, the corresponding region is output as H_REGION[N:1] 128. Note that as illustrated in FIG. 9, broadcast region control unit 120 includes 3 broadcast region definitions; however, any number of regions, Y, may be defined. These upper and lower bound registers (146, 148, 150, 152, 154, and 156) may all be user programmable via REGION_SPECIFIERS 122 which provides both the values and control signals to load these registers.

In alternate embodiments, other methods and registers may be used to define the broadcast regions. For example, a base address and a mask may be used to define each broadcast region rather than a lower and upper bound. Also, page attributes may be used to define broadcast regions in a system utilizing protections or relocation control (such as a table look aside buffer, TLB). In alternate embodiments, broadcast region control unit 120 may be also be located within control circuitry 40. Alternatively, the broadcast mask registers and broadcast region definition registers may be combined such that a particular mask is selected by a particular region. In this manner, the overhead for updating the masks and region definitions may be reduced. Also, as mentioned above, different broadcast regions may share a same broadcast mask, also reducing the number of broadcast mask registers. Also, alternate embodiments may not need to provide broadcast region information to coprocessor 14, thus eliminating the need for H_REGION[N:1] 128.

In an alternate embodiment of the present invention, broadcast regions 1–4 of FIG. 6 may also allow coprocessor 14 to implement a selective execution mode policy. The broadcast regions may also be referred to as execution regions. For example, by passing a signal indicating the current execution region (such as H_REGION[N:1] 128 described above), processor 12 can provide an execution context to coprocessor 14. That is, H_REGION[N:1] 128 may be used to allow coprocessor 14 to set itself up to operate in different and unique data driven operating modes which are dynamically selected during operation of processor 12 by the value of H_REGION[N:1] 128. For example, depending on the current execution region (i.e. which section of the program code is currently being executed), coprocessor 14 can be set up to operate in different modes or perform different functions in response to H_REGION [N:1] 128. For example, if H_REGION[N:1] 128 indicates execution region 2, then coprocessor 14 may perform a Cyclic Redundancy Check on a transfer to memory, and if H_REGION[N:1] 128 indicates execution region 3, coprocessor 14 may perform a filtering function or a hardware hashing function instead. Therefore, coprocessor 14 can alter its functionality in response to a current execution region.

In some embodiments of the current invention, the concept of modifying operation of the coprocessor 14 in response to receiving a current execution region specifier via H_REGION[N:1] allows the coprocessor to be simplified, as well as reduces the overhead of command transfer between processor 12 and coprocessor 14. Coprocessor 14 may operate in a data-driven manner, in which processing occurs in response to a transfer of data from processor 12 via HDP[31:0] 72 and an indication via REG[4:0] 68 of the register in GPRs 46 which is being updated. When coupled with the concept of broadcast masks, only the exact data driving items are passed to coprocessor 14. In this manner, each value indicated by REG[4:0] 68, corresponding to the destination register of an instruction being executed by processor 12, may further function to indicate a particular operation to be performed by coprocessor 14 as a function of the current execution context. Instruction execution by processor 12 may target particular registers within GPRs 46 to effect indirectly a selected function by coprocessor 14 when a register broadcast operation occurs. In addition, the selected function to which a particular encoding of REG[4: 0] 68 corresponds may change as execution contexts indicated by H_REGION[N:1] change, without the overhead of explicitly reconfiguring coprocessor 14 by processor 12.

In the foregoing specification, the invention has been described with reference to specific embodiments. However, one of ordinary skill in the art appreciates that various modifications and changes can be made without departing from the scope of the present invention as set forth in the claims below. For example, the circuitry described herein can be embodied in a single integrated circuit, or more than one integrated circuits, or in a combination of hardware and software. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. In a processor having a register file comprising a plurality of registers and a broadcast specifier corresponding to the register file, a method comprising:
   providing storage circuitry which stores the broadcast specifier, the broadcast specifier comprising a plurality of broadcast indicators, each broadcast indicator within the plurality of broadcast indicators corresponding to one of the plurality of registers and indicating whether or not a write to the corresponding register is to be broadcasted via a coprocessor communication bus;
   receiving an operand to be written to said register file;
   selecting one of said plurality of registers in said register file;
   providing to said register file said operand to be written to said register file; and
   selectively providing via said coprocessor communication bus said operand to be written in said register file based on the broadcast specifier, wherein said operand is provided to said coprocessor communication bus when the broadcast indicator corresponding to the selected one of said plurality of registers indicates that broadcasting is enabled and said operand is not provided to said coprocessor communication bus when the broadcast indicator corresponding to the selected one of said plurality of registers indicates that broadcasting is not enabled.

2. The method of claim 1, wherein the broadcast specifier is one of a plurality of broadcast specifiers within the processor, each of the plurality of broadcast specifiers corresponding to at least one broadcast region of the processor.

3. The method of claim 2, further comprising: selectively providing, via said coprocessor communication bus, a region indicator corresponding to a current broadcast region of a current write transaction.

4. The method of claim 2, wherein the at least one broadcast region corresponds to a range of instruction addresses.

5. In a processor having a register file comprising a plurality of registers a method comprising:
   receiving an operand to be written to said register file;
   selecting one of said plurality of registers in said register file;
   providing to said register file said operand to be written to said register file; and
   selectively providing via a coprocessor communication bus said operand to be written in said register file based on a current execution region of said processor, wherein the current execution region corresponds to a range of instruction addresses in which a current address indicated by a program counter of the processor falls, and wherein selectively providing comprises:
      determining whether broadcast is enabled for the current execution region, and
      if broadcast is enabled for the current execution region, providing said operand via said coprocessor communication bus, and if broadcast is not enabled for the current execution region, not providing said operand via said coprocessor communication bus.

6. A processor, comprising:

a plurality of registers;

circuitry for performing a write operation to one of the plurality of registers;

conductors for providing an operand for the write operation to said one of the plurality of registers;

storage circuitry which stores_a set of broadcast specifiers, each broadcast specifier within the set of broadcast specifiers comprising a plurality of broadcast indicators wherein each broadcast indicator corresponds to a register of the plurality of registers and indicates whether or not a write to the corresponding register is to be broadcasted;

compare circuitry for comparing the one of the plurality of registers and a corresponding broadcast indicator within a selected one of the broadcast specifiers and for providing a broadcast enable signal, wherein the broadcast enable signal enables broadcasting when the corresponding broadcast indicator indicates broadcasting for the one of the plurality of registers and the broadcast signal does not enable broadcasting when the corresponding broadcast indicator does not indicate broadcasting for the one of the plurality of registers; and a port, coupled to the compare circuitry, for communicating with a coprocessor communication bus, said port comprising at least one coprocessor communication bus signal for providing said operand when said broadcast enable signal enables broadcasting and not providing said operand when said broadcast enable signal does not enable broadcasting.

7. The processor of claim 6, further comprising:

a program counter unit, for indicating address locations; and a broadcast region control unit, coupled to the program counter unit, for indicating when the indicated address location from the program counter unit falls within one of a set of broadcast regions.

8. The processor of claim 7, wherein the port further comprises at least one coprocessor communication bus signal indicating a current broadcast region from the set of broadcast regions when the indicated address location falls within one of the set of broadcast regions.

9. The processor of claim 7, wherein the broadcast region control unit comprises a plurality of region storage devices, wherein each broadcast region within the set of broadcast regions has a corresponding region storage device.

10. The processor of claim 9, wherein each region storage device comprises an upper bound storage device and a lower bound storage device to define each broadcast region.

11. The processor of claim 9, wherein each region storage device comprises a base location storage device and a mask storage device to define each broadcast region.

12. A processor, comprising:

a plurality of registers;

circuitry for performing a write operation to one of the plurality of registers;

conductors for providing an operand for the write operation to said one of the plurality of registers;

a program counter unit, for indicating address locations;

an execution region control unit, coupled to the program counter unit, for indicating when the indicated address location from the program counter unit falls within one of a set of execution regions, each execution region indicating a range of instruction addresses; and a port, coupled to the execution region control unit, for communicating with a coprocessor communication bus, said port comprising at least one coprocessor communication bus signal indicating a current execution region from the set of execution regions when the indicated address location falls within one of the set of execution regions.

13. The processor of claim 12, wherein said port further comprises:

at least one coprocessor communication bus signal for selectively providing said operand to be written to said one of the plurality of registers during said write operation based on the current execution region.

14. The processor of claim 12, wherein the execution region control unit comprises a plurality of region storage devices, wherein in each execution region within the set of execution regions has a corresponding region storage device for defining the execution region.

* * * * *